April 14, 1964     E. Z. GABRIEL     3,128,944
PRECISION TRIANGLE SOLVER AND COMPUTER
Filed July 27, 1961     3 Sheets-Sheet 1
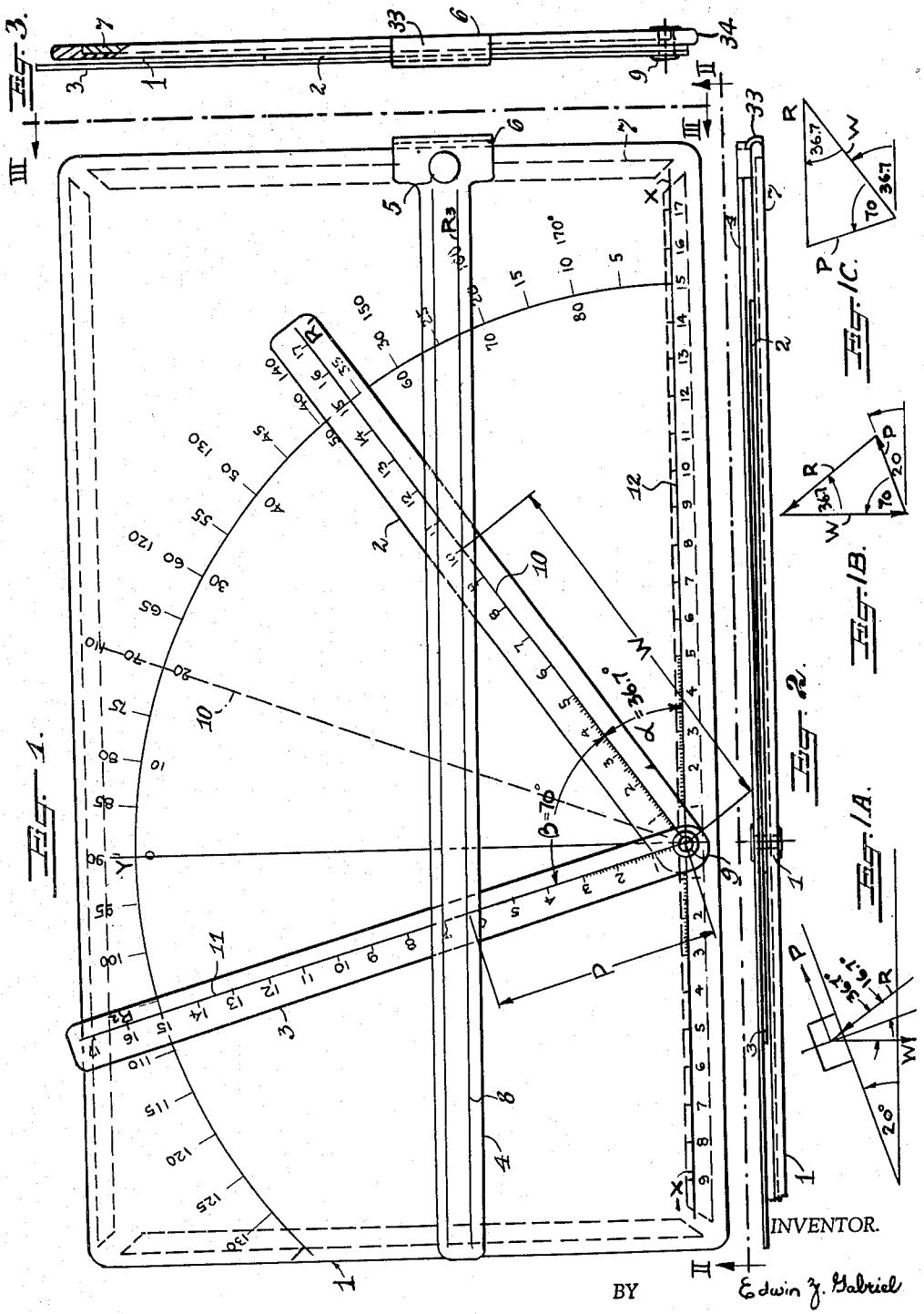
INVENTOR.
BY Edwin Z. Gabriel April 14, 1964    E. Z. GABRIEL    3,128,944
PRECISION TRIANGLE SOLVER AND COMPUTER
Filed July 27, 1961    3 Sheets-Sheet 2
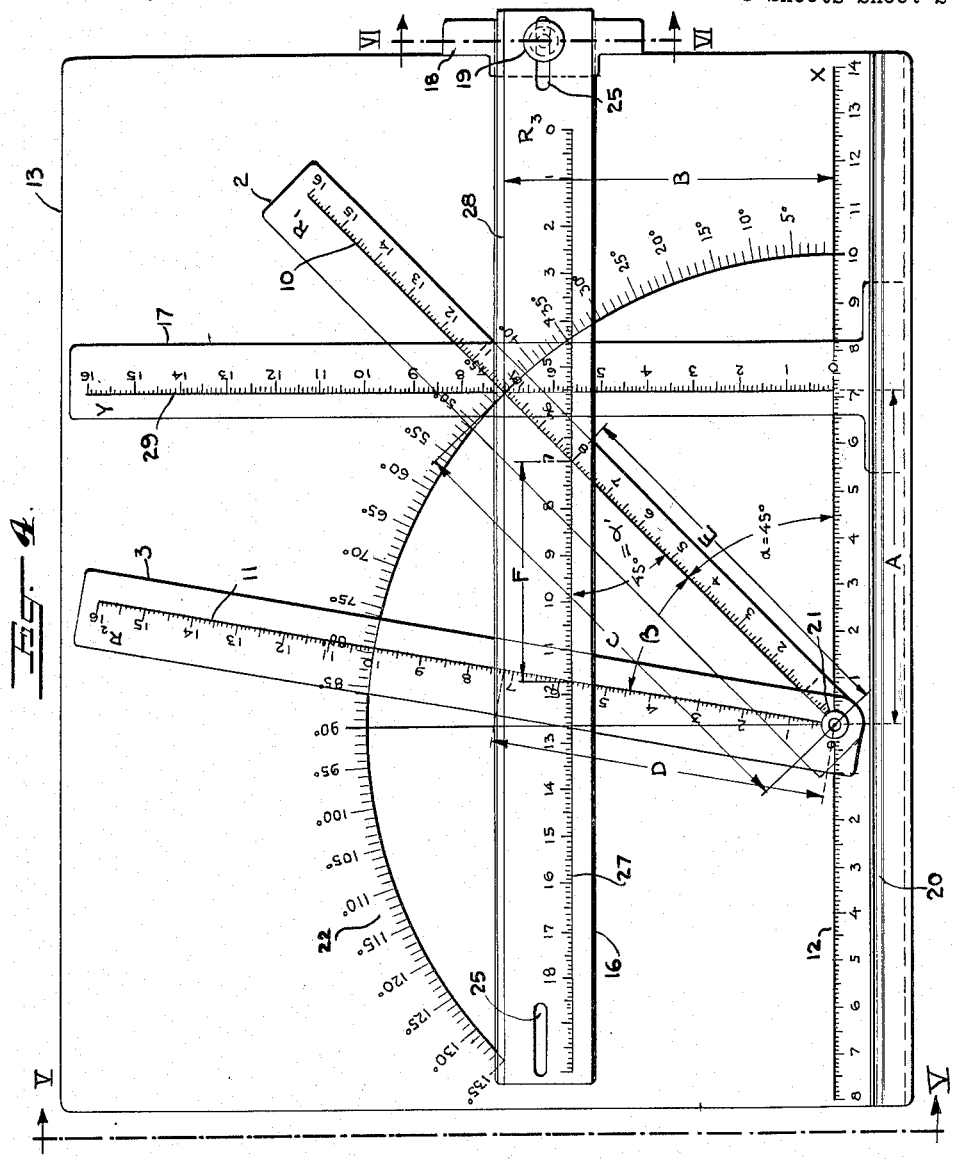
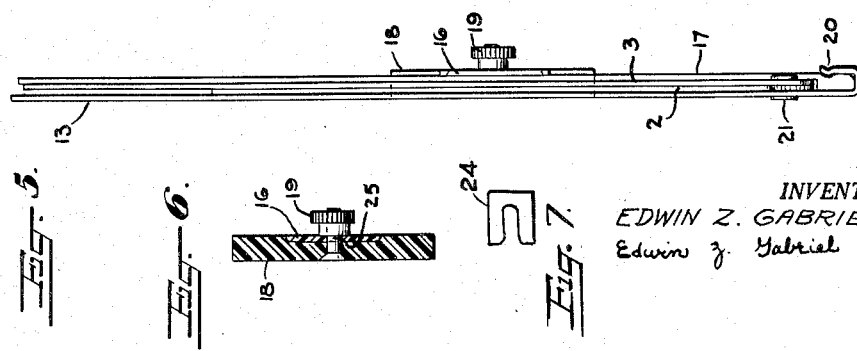
INVENTOR.
EDWIN Z. GABRIEL.
Edwin Z. Gabriel April 14, 1964 — E. Z. GABRIEL — 3,128,944
PRECISION TRIANGLE SOLVER AND COMPUTER
Filed July 27, 1961 — 3 Sheets-Sheet 3
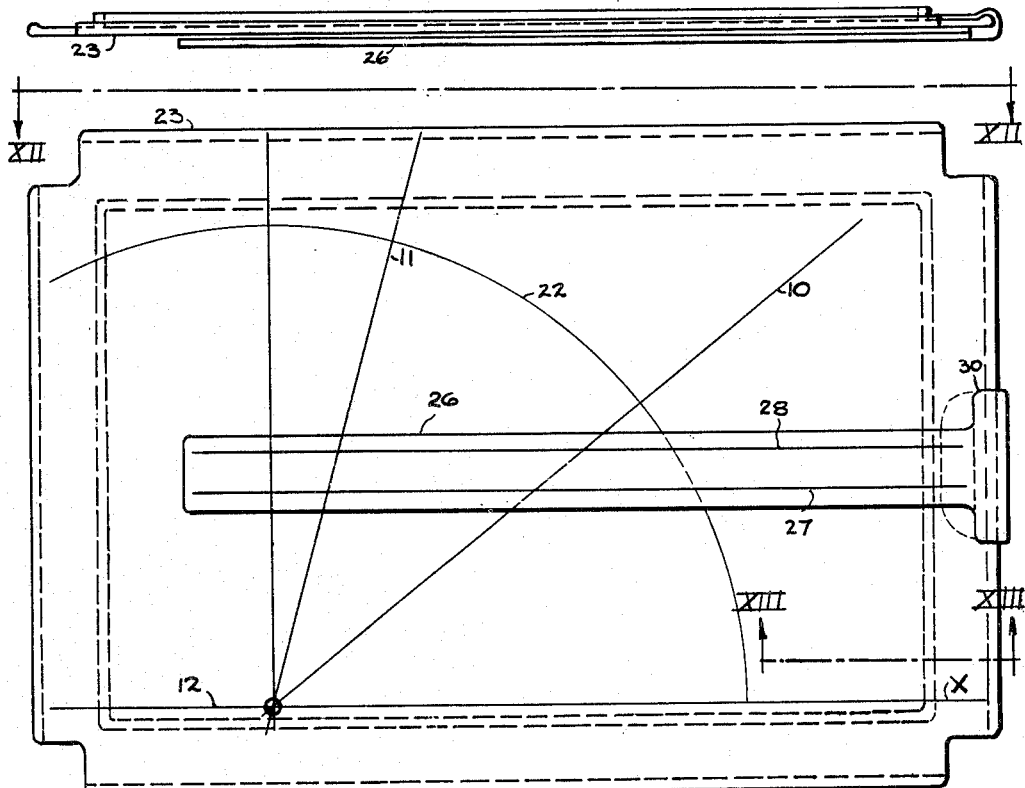
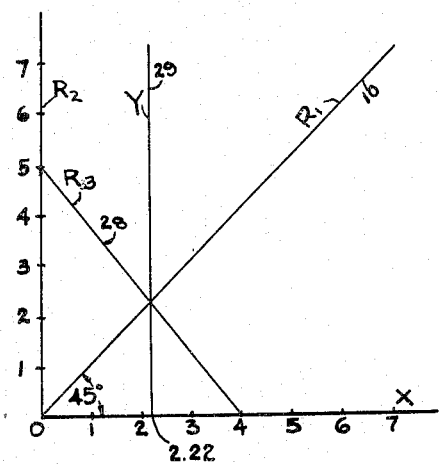
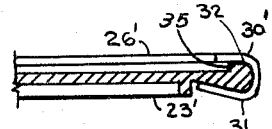
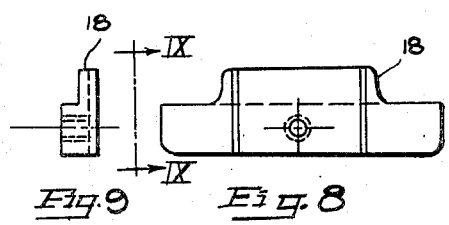
INVENTOR.
BY Edwin Z. Gabriel United States Patent Office 3,128,944
Patented Apr. 14, 1964

3,128,944
PRECISION TRIANGLE SOLVER AND
COMPUTER
Edwin Z. Gabriel, 91 Mount Tabor Way,
Ocean Grove, N.J.
Filed July 27, 1961, Ser. No. 127,262
8 Claims. (Cl. 235—61)

This invention relates to computers and more particularly to a manual type of computer adapted to solution of various problems met with in mathematics examples of which are: solving for unknowns in triangular geometric problems, including solutions involving oblique triangles; obtaining sines, cosine and tangent function of angles; and demonstrating theorums proven analytically in plane geometry.

The invention proposes an instrument from which readings may be made with corresponding accuracy as with readings from slide rules so that it may be used in conjunction with a slide rule by interchange of readings from one to the other with equal dependability. For example, by extending the X-scale to 14 units and the R-scale to 16 units, four significant figures are obtainable from 10 to 14 on the X-scale and from 10 to 16 on the R-scale. In the slide rule approximately four significant figures are obtained from 10 to 20 but with less accuracy than the proposed instrument. Then the distance between 5 and 6 of the 10 in. Manheim slide rule may be made equal to each main division of this instrument, and a uniform scale is easier to read than a logarithonic scale, with the distances between divisions progressively becoming smaller. In addition, to obtain an unknown side of a right triangle, for example, the leg opposite a known angle when the hypothenuse also is known, when using the slide rule it is necessary to look up the sine of the angle and then multiply it by the length of the hypothenuse, and a round-off error results in approximating the third significant figure for each operation. When using this instrument herein often called the P.T.S., the only round-off error exists in the single operation of reading directly the final answer. Consequently, as a whole, it may be stated that the readings from this instrument and the slide rule are interchangeable, provided each instrument is manufactured under identical standards of accuracy.

A computer is provided by this invention capable of checking results of trigonometry problems initial solution of which has been made by some other method—usually a more tedious one. Since an accurate graphical and pictorial solution of the problem is presented with this invention, the solutions from this instrument can be considered more reliable than that by other methods in which such a graphical presentation is omitted. Also when solving for the unknown sides of a triangle in which one side and adjacent angles are known, to check one's answers, one need only to interchange angles on the computer. The sides opposite the respective known angles should be the same as before. No such quick check on answers or solutions is available on other existing mechanical computers.

Because an accurate physical geometric configuration is presented, this computer provides also as a visual aid in teaching of trigonometry and plane geometry to students.

A further object of the invention is to provide a mechanical structure usable for laying out work and obtaining solutions with delineations at desired angles and prescribed lengths.

In a broad aspect, the invention may be said to provide a structure which will physically designate lengths of sides of triangle and trapezoids and angles between sides for direct reading of unknowns of either or both linear or angular characters.

Other objects, advantages and novel structural features contemplated in the invention will appear to persons skilled in the art to which it appertains as the description proceeds, both by direct recitation thereof and by inference from the context.

Referring to the accompanying drawings, in which like numerals of reference indicate similar parts throughout the several views:

FIGURE 1 is a plan of a computer wherein the $R_1$ and $R_2$ scales are each shown making oblique angles with the horizontal. Hairline $R_3$ of horizontal member 4 is shown crossing the $R_1$ hairline at the prime graduation 10.

FIGURES 1A, 1B and 1C are line diagrams of a certain mechanics problem.

FIGURE 2 is side end view of computer to show relative thickness of the moving parts and the basal member.

FIGURE 3 is a bottom end view of the computer to show shape of curved edge of foot of $R_3$ scale member.

FIGURE A is a line diagram of the problem with the forces exerted on load L indicated. FIGURE B is the vector force diagram alone. FIGURE C is the force diagram reoriented.

FIGURE 4 is a plan of a computer, similar to FIGURE 1, but with the addition of a graduated scale imprinted on under side of removable horizontal member 16 and a graduated vertical scale member. Vertical scale member is held in position and constrained to move translationally by a fold-over along bottom edge of basal member. The fold-over also provides the function of keeper for said vertical scale member. The folded-over strip has an indentation lengthwise along its upper edge as shown in FIG. 5 so that the base of the T-square may be held in position as it is slid along the fold of the folded-over strip. The base of the T-square may have a groove to receive this indentation in the fold, as shown in FIG. 5. In use, the T-square would slide in contact with the straight edge provided at the base of the fold and be retained perpendicular to that edge.

FIGURE 5 is a side-end view to show the shape of the keeper for said Y-scale member, as well as to show the relative thickness and positions of parts.

FIGURE 6 is a sectional partial view showing foot end of horizontal scale member.

FIGURE 7 is a plan of a certain U-shaped washer.

FIGURE 8 is a plan of one form of T-square foot.

FIGURE 9 is a side view of the foot of FIG. 8.

FIGURE 10 is a diagram of a sample problem to be solved by the computer of this invention.

FIGURE 11 is a plan of a modified construction of computer.

FIGURE 12 is an edge view of the computer of FIG. 11.

FIGURE 13 is a sectional view on line XIII—XIII of FIG. 12.

In the specific embodiment of the invention illustrated in said drawings, the reference numeral 1 designates a basal plate of suitable size, shape and material, here shown as substantially rectangular and preferably comprised of a moderately stiff white sheet of plastic or the like, and with rounded edges. In conjunction with this basal plate or sheet 1, there are provided three graduated scale members 2, 3 and 12 of which member 12 extends along the bottom margin of said basal plate and provides a horizontal hairline X with scale markings of small increments of length, such as shown in FIGURES 1 and 4. In their entirety, these markings will be designated herein as the X-scale on the right side of the vertical Y' hairline and as the X-scale on the left side of the Y' hairline. Desired sub-divisional markings may be provided between successive main or prime division markings to divide the prime divisions into halves, tenths and twentieths, or into any other desired increments of length. The scale markings begin at the origin of the Y' and R scales as the zero location and proceed from zero to the maximum number of such divisions, for instance, zero to fourteen or sixteen or other chosen maximum. All distances between each of the main subdivisions are equal to each other and the scale is intended to afford readings of linear dimensions on basal plate. In addition to horizontal scale X, there is imprinted an arcuate scale, here shown from 0° to 135°, graduated in one-half (½) degree increments, although this scale could extend to 180°. In most cases the sum of the two angles selected in solving oblique triangles will not exceed 135° and, consequently, it would appear unnecessary to extend the basal plate 1 to accommodate the entire 180 degrees of arc.

The second and third scale members 2 and 3 of FIG. 1 and of FIG. 4 are pivoted only. Pivoting means, such as eyelet 9 in FIG. 1 or eyelet 21 in FIG. 4 attaches these solely swingable members directly to the top face of basal plate 1, the center of said eyelet being directly above the hypothetical zero of fixed scale-X. These swingable members are provided to have suitable frictional retention in order to maintain them at any angular position to which they are set, which may be accomplished by predetermined tightness of eyeletting or by spring washer or otherwise. Said solely swingable members 2 and 3 have longitudinal hairlines as indicated with transverse scale markings corresponding in spacing and numerical indicia to the spacing and indicia of the X-scale. Said solely swingable members are also preferably transparent. The hairline and other scale markings forming the $R_1$ and $R_2$-scales, respectively, on these solely swingable members are more desirably on the upper face thereof so as to avoid parallax with the markings of the horizontal scale members 4 and 16. The zero markings register with the axial center of pivoting of said arms, and the lengths of arms and number of markings may accord with wishes of the maker.

The fourth scale member 4 is solely slidable and in FIGURE 1 may be used to slide along any one of the four edges. It is shown here to slide along the right edge. Its cross member 6 contains a curved extension 33 to follow the contour of the basal plate's rounded edge 34 so that it will stay snugly against the edge in whatever position it may be set by the user. To assure that it will stay put, a round-shaped strong permanent magnet 5 is imbedded at the top of cross member 6. Underneath and along the four edges of plate 1 are imbedded ferrous metal strips 7, so that the magnet is attracted to the metal strip. This translationally movable scale member 4, herein designated as a T-square, has longitudinal hairlines 8, along its underside. In FIGURE 1 said member has no scale markings to afford like readings in length. The length of said member may be obtained by interchanging angles α and β, by simply making angle α equal to β. Omitting the scale marking on the underside of member 4 makes for easier reading of lengths on scales $R_1$ and $R_2$ where hairline 8 crosses hairlines 10 and 11. Also, entire basal sheet 1 may be ferrous metal having a white enamelled surface, so that ferrous metal strips 7 would then be unnecessary.

Using the embodiment shown in FIG. 4, with the addition of scale 27, the user can obtain simultaneously the third side of the triangle and with the aid of scale 29 he can simultaneously obtain the horizontal and vertical components of one of the sides, such as components of length C. The vertical scale 29 has been displaced from point 8 to point 10 on scale 10 in order not to have too many scales intersecting at one point. In the actual construction, the scales will be of different colors for clearer reading of the scale lengths, and thus the difficulty experienced in having all black-lined scales would be avoided. Also the advantage in having four different scales is that problems involving combinations of triangles and trapezoids may be solved simultaneously. For example, in addition to obtaining the sides of oblique triangle represented by sides C, D and angle B, the components of side C are obtained as indicated by legs A and B. In addition, the three sides of oblique triangle represented by sides E and F and included angle α' are obtained. It is conceivable that if the sides and angles of a trapezoid were desired, scales 12, 11, 27 and 29 could form the sides of the desired geometric figure.

As an example of how the computer in FIG. 1 may be applied to a problem in mechanics, consider the following.

Figure A shows a load L being supported on an inclined plane with force P acting to just start the load uphill against frictional resistance. The combined friction and normal forces give reaction R at angle of 36.7° with the vertical. Weight W of load is 100 lbs. The inclination of the plane with horizontal is 20°. Force P is required. Figure B shows the force triangle alone while Figure C shows the force triangle oriented with the unknown side along scale $R_2$ as it would appear on the computer. The problem resolves itself to finding one unknown side with one side and its adjacent angles known.

Again refer to FIG. 1. In order to compute the second side P, set radial member $R_1$ to angle α which equals 20°. Add angle β to angle α to equal to 106.7° and set radial member $R_2$ to this angle.

Now slide member containing hairline $R_3$ along either edge of base sheet until one of its hairlines crosses the $R_1$ scale hairline at known value of 100 lbs. represented by distance ten (10). Read length P on scale $R_2$. It will be the distance at which hairline 8 crosses hairline 11.

If reaction R is desired, interchange angles α and β and repeat setting of horizontal hairline at 10 on the $R_1$ member hairline. This time the length along $R_2$ member, at which hairline 8 crosses hairline 16, represents reaction force R. As in the slide rule, the user determines where the decimal point should be in the answer.

The third angle of the triangle angle γ can be read directly opposite 106.7° on the second concentric angular scale called the supplementary scale 73.3°.

The adjustability of the position of the graduations along the horizontal T-square as shown in FIGURE 4 is desirable for direct solving of the third side. This might make for less chance of confusion than rotating the $R_1$ hairline to angle β in order to get the third side. By loosening knurled nut 19, member $R_3$ can be slid along cross-member 18 until a prime graduation of the scale can be placed in direct super position over the point of desired intersection of a diagonal $R_1$ or $R_2$. Using this point as reference, one can count over to the point where the $R_3$ hairline crosses the hairline of the other radial member.

FIGURE 7 shows a U-type washer 24 for placing under scale member 16 in order to lift it sufficiently so that the angle of member 16 may be adjusted with reference to edge of foot 18.

FIGURE 8 shows a detail drawing of foot 18 of T-square 16. FIGURE 9 is side view of foot.

FIGURE 10 shows a sample problem which can be solved on computer shown in FIG. 4. The scales $R_1$, $R_2$, $R_3$ and X in FIG. 10 correspond to the same lettered scales as in FIG. 4. The example shown is that for two parallel resistors, one of which is 4 ohms and the other 5 ohms. To obtain the equivalent resistance of the parallel combination, set and adjust edge of foot 18 against bottom edge of plate 13 so that hairline 28 will cross X-axis at graduation 4 and also at graduation 5 on the $R_2$ axis, shown positioned at right angles to the X-axis. Hairline 10 of member $R_1$ is set at 45° with the X-axis. Then member 17 having a longitudinal blade is positioned so that its hairline 29 crosses the intersection of $R_1$ and $R_3$. The equivalent resistance is found on the X-axis where hairline 29 crosses it. In this case, it is 2.22; the position of the decimal point is determined from the value of the smaller of the two known resistors. If a third resistance, say 6 ohms, existed in parallel with the 4 and 5 ohm resistances, then an identical procedure would enable one to obtain the equivalent resistance of the 2.22 and 6 ohm resistances.

Other applications of computer shown in FIG. 4 may be the following:

(1) To set up simulated vector diagram for computing regulation of a transformer or an alternator.

(2) To use right triangle solver to obtain length and direction of vector in three-dimensional space.

(3) To obtain the velocity and acceleration polygons of a link mechanism.

FIGURE 11 shows a plan view of another configuration of the base plate 1 and T-square 4 of FIG. 1. The essential difference between the two figures is in the method of supporting and holding member 26 in place mechanically as against holding the corresponding member 4 in place with aid of magnet 5. In FIG. 11 base plate 23 has either a beaded bottom edge surrounding its periphery as shown inward to a thinned section as shown in FIG. 13. The foot 30 of T-square 26 is then bent around so that it follows the contour of edge of plate 23, as shown in FIG. 12. Now the T-square may be slid along any one of the four edges of plate 23 without requiring the user to apply pressure against foot 30 to keep hairlines 27 and 28 constantly perpendicular to edge against which foot is slid. In a similar manner, in FIG. 13, T-square 26' is held to plate 23' so that application of pressure against foot 30' is unnecessary. Projections underneath plates 23 and 23' enable T-square to be slid on table top, without bottom of foldover having frictional engagement with supporting surface or table.

The only difference between horizontal scale members 26 and 26' is in the contour of the foot. It should be noted that the contour of foot 30' is simpler to produce either by injection molding or by a hot forming process of a plastic material than is foot 30. Member 26' with foot 30' can be produced and formed easily without injection molding, as the entire piece is of the same thickness and the bend at 31 is not complicated. Plate 23' is identical with plate 23 except for the form of the edges. In the case of plate 23', there is a slight rise on the top surface along the side edge 35. It is recommended that this rise exist on one other edge only; namely, the bottom edge 36, as this riser could interfere with the free movement of scale member R₁. The curved contour of the bottom portion of the edge at 31 need exist only at the two sides at which a riser 32 having a rounded contour exists. The cut-outs at the four corners of base plate 23 permit removal and insertion of T-square without effort. However, it is possible to remove the T-square without any cut-out.

In addition, the computers represented by FIG. 1 and FIG. 4 may be used for computation in subdued light by using luminous paint for printing. This type of printing is already being performed by silk and metal screen processes.

What is claimed is:

1. A computer for solving oblique triangles, comprising a flat sheet-like basal member having an arcuate graduated scale of more than 90° thereon described about a center on said basal member, said basal member having straight horizontal and vertical side edges, two movable arm means pivotally fixed to said basal member at said center and having free ends extending across said arcuate scale, each said arm means having a longitudinally extending graduated scale thereon, a third movable arm member having a length which extends from a side edge of said basal member across said arcuate scale and across said pivoted arm means, said third arm member and basal member having interengaging guiding means retaining said third arm member slidable and at all times normal to a side edge of said basal member, said interengaging guiding means comprising a folded over part in the form of a continuous loop integral with one of said members and a straight edge part on the other of said members normal to the longitudinal axis of said third arm member and resiliently and frictionally engaged by said folded over part, said loop being parallel with a side edge of said basal member and opening in a direction inwardly of said basal member, the closed part of said loop having sliding engagement with the straight edge part of the other of said members.

2. A computer in accordance with claim 1, wherein the loop guiding means is provided on the said third arm member, and said basal member provides a raised edge as part of its guiding means which conforms in cross-section substantially to the form of the closed portion of the loop guiding means of the said third arm member.

3. A computer for solving triangles in accordance with claim 1, wherein said arcuate scale has an extent of at least 120°.

4. A computer of the character described, comprising a basal plate having an X-scale extending across the same proximate to an edge thereof, and providing a raised edge in parallelism along one or more sides of said plate having straight edges as part thereof, a Y-scale member with a zero graduation and with its base end folded over as a loop as a continuous integral part thereof, open in a direction toward the plate with an end overlying said plate inwardly of said raised edge, said loop being closed at its end in opposition to said open end for including said raised edge therein and making slidable engagement with said raised edge and with said straight edge, and held in position by said raised edge to move translationally with the zero graduation of its scale at a constant distance from said straight edge while retaining said Y-scale perpendicular to said X-scale, at least one solely pivoted R-scale member having its pivot center fixed on said basal plate at a distance equal to said constant distance of the Y-scale's zero graduation from said straight edge, and a graduated arcuate scale on said basal plate centered at said pivot center of said solely swingable R-scale member.

5. A computer of the character described, comprising a basal plate having an X-scale extending across the same proximate to an edge thereof, and providing a resilient folded-over strip forming a recess between said strip and plate opening in a direction toward said plate above the same and providing a straight edge at the base of said recess opposite to said opening, a Y-scale member having a longitudinal blade with an index line and graduations, said Y-scale member having a base transverse to said blade and of greater transverse length than the width of said blade and in slideable engagement in said recess with the resilient folded-over strip keeping said transverse base portion perpendicular to and against said straight edge of said folded over strip and translationally movable with said index line at the origin of said Y-scale at a constant distance from said straight edge, a solely pivoted R-scale member having its pivot center fixed on said basal plate at a distance from said straight edge equal to said constant distance of said Y-scale's index line from said straight edge, and an arcuate scale on said basal plate centered at the said pivot center of said solely swingable R-scale member.

6. A computer of the character described comprising a basal plate having an arcuate scale with an arc line and an X-scale emanating from center of said arc extending across said basal plate proximate to an edge thereof, said plate providing a folded-over strip forming a recess between said strip and plate opening in a direction toward and over said plate and providing a straight edge within said recess opposite to said opening, said strip having an indentation lengthwise thereof and directed toward the plate at a part of the strip proximate to said straight edge, a graduated Y-scale member having a longitudinal blade and a transverse base portion of greater transverse length than width of said blade, said base portion having a longitudinal groove positioned to receive said indentation of the strip, said base portion being held in slidable engagement in said recess and against said straight edge by resilient pressure exerted by said folded-over strip, said Y-scale member being thereby maintained translationally moveable across said basal plate constantly perpendicular to said straight edge, and at least one solely pivoted R-scale member having its pivot center fixed on said basal plate at the center of said arc.

7. A computer for solving oblique triangle, comprising a flat sheet-like member having an arcuate graduated scale of more than 90° thereon described about a center on said base member, said base member having straight horizontal and vertical side edges, two movable arm means pivotally fixed onto said base member at said center and having free ends extending across said arcuate scale, each said arm means having a longitudinally extending graduated scale thereon, a third movable arm member having a length which extends from a side edge of said base member across said pivoted arm means, and guide means for guiding said third arm member in its movement and maintaining it at all times normal to a selected side edge of said base member, said guide means comprising a selected side edge of said base member cooperating with an end margin of said third arm member juxtaposed thereto, said end margin being formed as a folded-over foot forming a guide channel engaging against and over said selected side edge of said base member, said folded over foot providing longitudinal guiding engagement with said selected edge of said base member, and providing frictional but manually slidable gripping engagement with said base member proximate to said selected edge.

8. A computer for solving triangles, comprising a flat sheet-like basal member having an arcuate graduated scale of at least 90° thereon described about a center on said basal member, said basal member having straight horizontal and vertical side edges, movable arm means pivotally fixed to said basal member at said center and having a free end part extending across said arcuate scale, said arm means including a longitudinally extending graduated scale, a movable arm member having a length which extends from a side edge at said basal member across said arcuate scale and across said pivoted arm means, said arm member and basal member having interengaging guiding means retaining said arm member slidable and at all times normal to a side edge of said basal member, said interengaging guiding means comprising a folded-over part in the form of a continuous loop integral with one of said members and a straight edge part on the other of said members normal to the longitudinal axis of said arm member and resiliently and frictionally engaged by said folded-over part, said loop being parallel with a side edge of said basal member and opening in a direction inwardly of said basal member, the closed part of said loop having sliding engagement with the straight edge part of the other of said members.

References Cited in the file of this patent

UNITED STATES PATENTS

| | | |
|---|---|---|
| 1,021,965 | Bolton | Apr. 2, 1912 |
| 1,665,527 | Brinkman | Apr. 10, 1928 |
| 2,403,614 | Ross | July 9, 1946 |
| 2,469,672 | Wartinen | May 10, 1949 |
| 3,010,210 | Snell | Nov. 28, 1961 |
| 3,014,646 | Gabriel | Dec. 26, 1961 |

FOREIGN PATENTS

| | | |
|---|---|---|
| 126,844 | Switzerland | July 2, 1928 |